(12) United States Patent
Kim et al.

(10) Patent No.: US 7,645,057 B2
(45) Date of Patent: *Jan. 12, 2010

(54) OPTICAL SHEET AND BACKLIGHT ASSEMBLY OF LIQUID CRYSTAL DISPLAY WITH THE SAME

(75) Inventors: Cheul Yong Kim, Gyeonggi-do (KR);
Sang Mook Kim, Gyeonggi-do (KR);
Jong Wook Huh, Gyeonggi-do (KR);
Dong Ryoul Kim, Gyeonggi-do (KR);
Ki Won Jeon, Gyeongsangbukdo (KR);
Ju Won Lee, Gyeonggi-do (KR); Eun Jung Ham, Seoul (KR); Myung Su Lee, Gyeonggi-do (KR)

(73) Assignee: Miraenanotech Co., Ltd., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/016,756

(22) Filed: Jan. 18, 2008

(65) Prior Publication Data

US 2008/0180598 A1    Jul. 31, 2008

Related U.S. Application Data

(63) Continuation of application No. 11/318,922, filed on Dec. 27, 2005, now Pat. No. 7,344,282.

(30) Foreign Application Priority Data

Apr. 21, 2005    (KR)    ............... 2005-0033262

(51) Int. Cl.
*F21V 5/04*    (2006.01)
(52) U.S. Cl. ............... 362/335; 362/330; 362/331; 362/333; 362/607; 362/611; 362/613; 362/614; 362/619; 362/625; 359/362; 359/364; 359/365; 359/366; 359/664; 359/710; 359/727

(58) Field of Classification Search ............... 362/330, 362/331, 333, 335, 607, 611, 613, 614, 619, 362/625; 359/362, 364–366, 664, 710, 727

See application file for complete search history.

(56) References Cited

U.S. PATENT DOCUMENTS

| 4,924,356 | A | 5/1990 | French et al. |
| 5,245,454 | A | 9/1993 | Blonder |
| 5,324,623 | A | 6/1994 | Tsumori |
| 5,394,255 | A | 2/1995 | Yokota et al. |
| 5,408,344 | A | 4/1995 | Takiguchi et al. |
| 5,587,816 | A | 12/1996 | Gunjima et al. |
| 5,886,759 | A | 3/1999 | Mashino et al. |

(Continued)

FOREIGN PATENT DOCUMENTS

JP    02-214287    8/1990

(Continued)

*Primary Examiner*—Sandra L O'Shea
*Assistant Examiner*—Meghan K Dunwiddie
(74) *Attorney, Agent, or Firm*—Saliwanchik, Lloyd & Saliwanchik (57) ABSTRACT

An optical sheet includes a substrate onto which light is incident, and a convex part protruded from the substrate by a predetermined thickness. A thickness of the convex part increases from an edge to a center thereof.

7 Claims, 10 Drawing Sheets

U.S. PATENT DOCUMENTS

| | | |
|---|---|---|
| 7,344,282 B2 * | 3/2008 | Kim et al. .................... 362/335 |
| 2003/0086030 A1 * | 5/2003 | Taniguchi et al. ............. 349/61 |
| 2003/0137824 A1 * | 7/2003 | Shinohara et al. ............. 362/31 |
| 2003/0184993 A1 | 10/2003 | Yamada |
| 2004/0120139 A1 | 6/2004 | Kunimochi et al. |
| 2004/0233656 A1 | 11/2004 | Lee et al. |

FOREIGN PATENT DOCUMENTS

| | | |
|---|---|---|
| JP | 5-089827 | 4/1993 |
| JP | 6-130387 | 5/1994 |
| JP | 8-240720 | 9/1996 |
| JP | 08-248403 | 9/1996 |
| JP | 9-101401 | 4/1997 |
| JP | 10-010304 | 1/1998 |
| JP | 11-142609 | 5/1999 |
| JP | 2002-120230 | 4/2002 |
| JP | 2004-006256 | 1/2004 |
| JP | 2004-126376 | 4/2004 |
| JP | 2004-145328 | 5/2004 |
| JP | 2004-145329 | 5/2004 |
| JP | 2004-191611 | 7/2004 |
| JP | 2004-200072 | 7/2004 |
| JP | 2004-309557 | 11/2004 |
| JP | 2005-55485 | 3/2005 |
| KR | 10-2001-0055519 A | 7/2001 |
| KR | 10-2005-0083468 A | 8/2005 |
| TW | 2006-38128 | 11/2006 |

* cited by examiner (related art)

FIG. 1

(related art)

FIG. 2

(related art)

OPTICAL SHEET AND BACKLIGHT ASSEMBLY OF LIQUID CRYSTAL DISPLAY WITH THE SAME

RELATED APPLICATION

This application is a continuation of U.S. application Ser. No. 11/318,922, filed Dec. 27, 2005, now U.S. Pat. No. 7,344,282 which claims the benefit of Korean Application No. 10-2005-0033262, filed on Apr. 21, 2005, which are hereby incorporated herein by reference in their entirety.

FIELD OF THE INVENTION

The present invention relates to a backlight assembly of a liquid crystal display device, and more particularly, to an optical sheet and a backlight assembly of a liquid crystal display with the same.

DESCRIPTION OF THE RELATED ART

Recently, to replace heavy and bulky cathode ray tube (CRTs), various kinds of flat panel displays have been developed. Examples of the flat panel displays are a liquid crystal display (LCD), a field emission display (FED), a plasma display panel (PDP), an electro-luminescence display (ELD), and so on. Many attempts have been made to provide an enhanced display quality and large screen of the flat panel displays.

The LCD has advantages of a small size, lightweight, and low power consumption. Therefore, the use of the LCD tends to gradually increase.

The LCD is a non-luminous display device that displays an image using a light source such as a lamp. The LCD displays an image using electrical and optical properties of liquid crystals injected inside a liquid crystal panel.

Unlike the CRT, the liquid crystals injected between a thin film transistor (TFT) substrate and a color filter substrate are not a light emitting material that emits light by itself, but a light receiving material that emits light by controlling an amount of an external light. Therefore, the LCD requires a backlight unit that irradiates light onto the liquid crystal panel.

The backlight unit includes a mold frame with a receiving space, a reflection sheet disposed in a base of the receiving space to reflect the light toward the liquid crystal panel, a light guide plate disposed on the reflection sheet to guide the light, a lamp unit disposed between the light guide plate and a sidewall of the receiving space to emit the light, optical sheets stacked on the light guide plate to diffuse and condense the light, and a top chassis disposed on the mold frame to cover from an edge portion of the liquid crystal panel to a side of the mold frame.

The optical sheets include a diffusion sheet, a prism sheet, and a protection sheet. The diffusion sheet diffuses the light, and a prism sheet is disposed on the diffusion sheet to condense the diffused light and transmit it to the liquid crystal panel. The protection sheet protects the diffusion sheet and the prism sheet.

Figure 1:
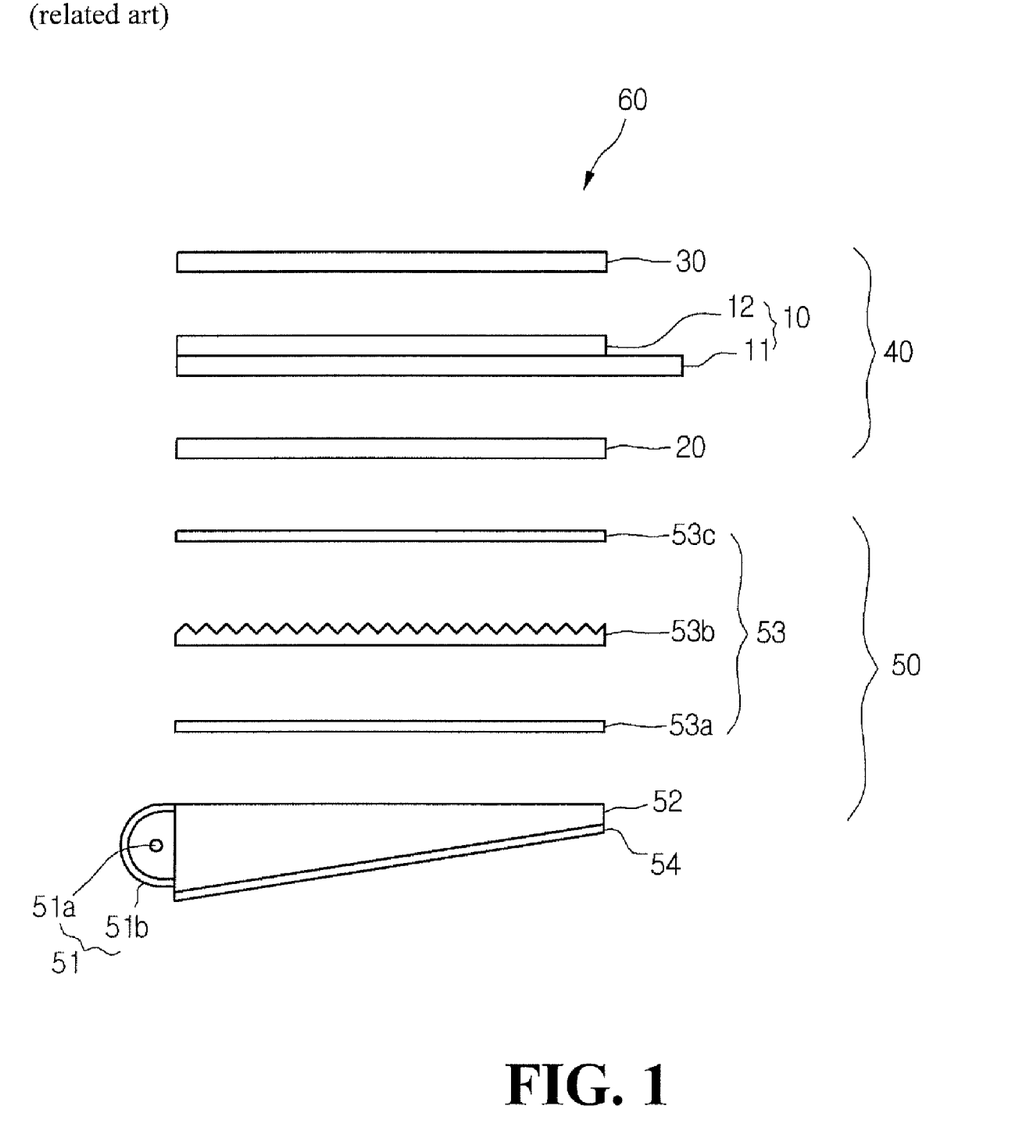
FIG. 1 is a sectional view of a related art LCD.

FIG. 1 is a sectional view of a related art LCD.

Referring to FIG. 1, the related art LCD includes a backlight assembly 50 for generating light, and a display unit 40 disposed above the backlight assembly 50 for displaying an image using the light generated from the backlight assembly 50.

Specifically, the backlight assembly 50 includes a lamp unit 51 for emitting the light, and a light guide unit for guiding the light emitted from the lamp unit 51 toward a liquid crystal panel 10.

Also, the display unit 40 includes the liquid crystal panel 10, a top polarizer 30 disposed above the liquid crystal panel 10, and a bottom polarizer 20 disposed under the liquid crystal panel 10. The liquid crystal panel 10 includes a TFT substrate 11 on which electrodes are formed, a color filter substrate 12, and a liquid crystal layer (not shown) interposed between the TFT substrate 11 and the color filter substrate 12.

More specifically, the lamp unit 51 includes a lamp 51a for emitting the light, and a lamp reflector 51b surrounding the lamp 51a. The light emitted from the lamp 51a is incident on a light guide plate 52, which will be described later. The lamp reflector 51b reflects the emitted light toward the light guide plate 52 to thereby increase an amount of light incident on the light guide plate 52.

The light guide unit includes the reflection plate 54, the light guide plate 52, and a plurality of optical sheets 53. The light guide plate 52 is disposed on one side of the lamp unit 51 and guides the light emitted from the lamp unit 51.

The reflection plate 54 is disposed under the light guide plate 52. Light leaking out from the light guide plate 52 is again reflected toward the light guide plate 52 by the reflection plate 54.

The optical sheets 53 are disposed above the light guide plate 52 to enhance the efficiency of the light guided by the light guide plate 52. In further detail, the optical sheets 53 include a diffusion sheet 53a, a prism sheet 53b, and a protection sheet 53c, which are sequentially stacked on the light guide plate 52.

The diffusion sheet 53a scatters the light incident from the light guide plate 52 and thus makes a luminance distribution uniform.

Also, a plurality of triangular prisms are repeatedly formed on the prism sheet 53b. The prism sheet 53b condenses the light diffused by the diffusion sheet 53a in a direction vertical to the surface of the liquid crystal panel 10. Therefore, most of light passing through the prism sheet 53b travels in a vertical direction with respect to the surface of the liquid crystal panel 10, thereby making the luminance distribution uniform.

In addition, the protection sheet 53c disposed above the prism sheet 53b protects the surface of the prism sheet 53b and diffuses the light such that the distribution of the light incident from the prism sheet 53b is made uniform.

Figure 2:
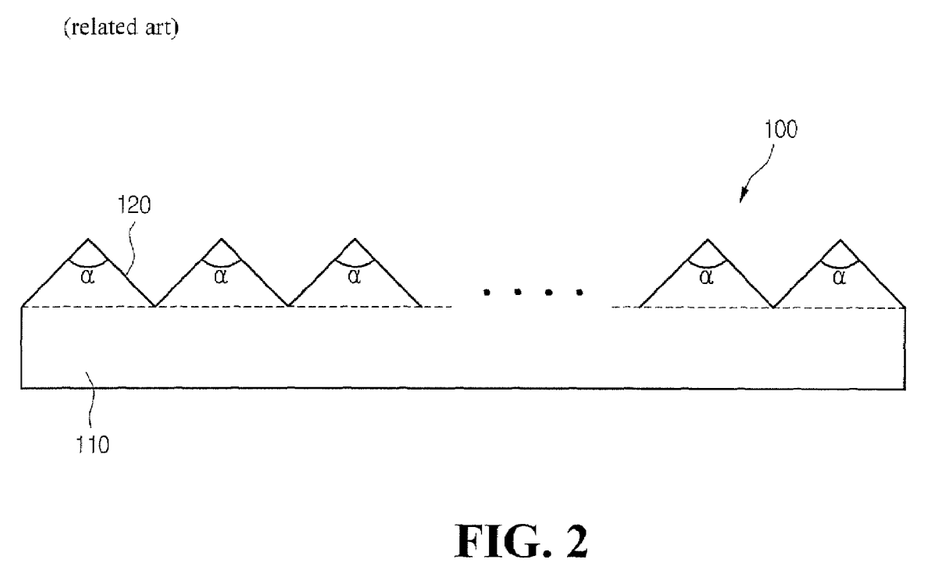
FIG. 2 is a sectional view of a prism sheet illustrated in FIG. 1.
Figure 3:
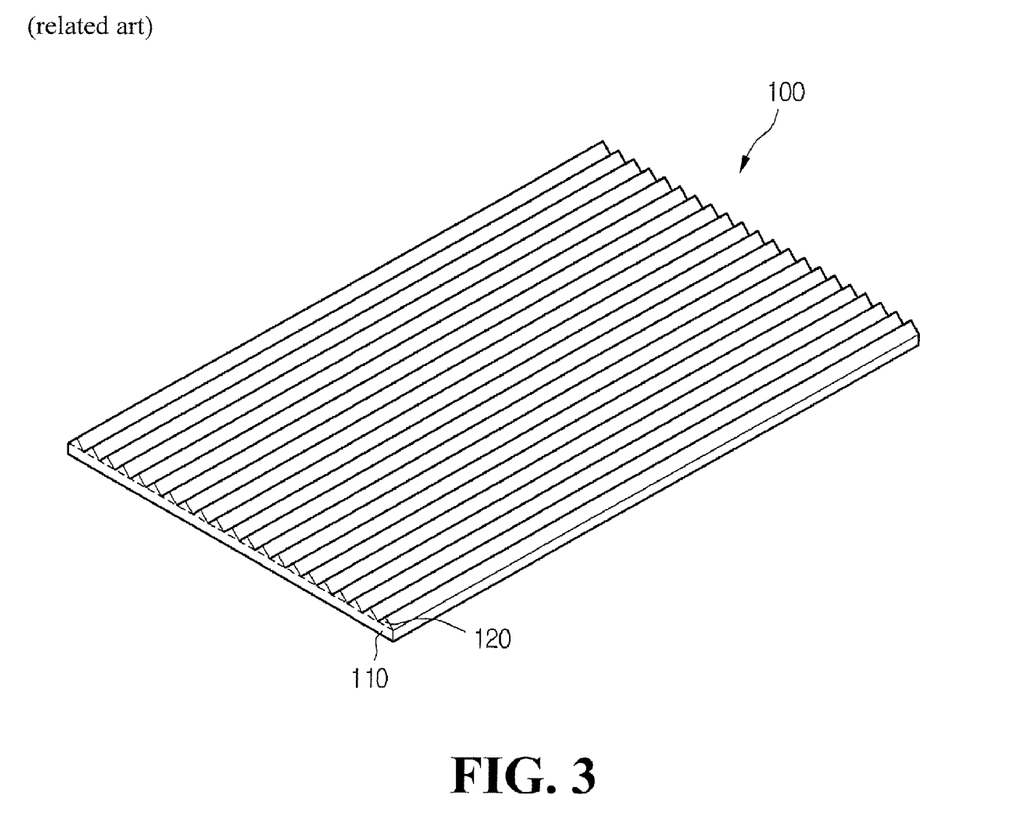
FIG. 3 is a perspective view of the prism sheet illustrated in FIG. 1.

FIGS. 2 and 3 are a sectional view and a perspective view of the prism sheet illustrated in FIG. 1, respectively.

Referring to FIGS. 2 and 3, the related art prism sheet 100 includes a substrate 110 and a protrusion part 120 formed in an isosceles triangular prism shape. The light diffused by the light guide plate and the diffusion sheet is initially incident onto the substrate 110. The protrusion part 120 allows the diffused light to travel constantly. The protrusion part 120 is linearly arranged on the substrate 110 in a stripe shape.

The protrusion part 120 has a pitch ranging from tens μm to hundreds μm. An apex angle α of the triangular prism ranges from 60° to 130°. As the apex angle α is more acute, the luminance is increasing but the viewing angle is getting narrower.

Meanwhile, as illustrated in FIGS. 2 and 3, when the protrusion part 120 is installed in a forward direction, that is, when the protrusion part faces the liquid crystal panel, the diffused light incident through the substrate 110 is refracted forward and collected, but the light incident onto the inclined face of the protrusion part 120 is lost without attribution to the improvement of the forward luminance due to a total internal reflection.

To solve this problem, the prism sheet may be reversely installed to make the protrusion part 120 face the light guide plate. However, in this case, the forward luminance is improved but the viewing angle becomes narrow. Consequently, it is unsuitable for flat panel displays requiring a wide viewing angle such as home TV.

SUMMARY OF THE INVENTION

Accordingly, the present invention is directed to an optical sheet and a backlight assembly of a liquid crystal display with the same that substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an optical sheet including: a substrate onto which light is incident; and a convex part protruded from the substrate by a predetermined thickness, a thickness of the convex part increasing from an edge to a center thereof.

In another aspect of the present invention, there is provided an optical sheet including a substrate having a flat surface onto which light is incident and an embossed surface on which a plurality of convex parts are formed.

In a further another aspect of the present invention, there is provided an optical sheet including: a substrate onto which light is incident; and a convex part protruded from one surface of the substrate by a predetermined thickness, wherein the light incident onto the substrate is condensed, diffused, and totally reflected by the convex part, and the light totally reflected by the convex part is reflected from the other surface of the substrate and condensed or diffused by the convex part.

In a still further another aspect of the present invention, there is provided a backlight assembly of a liquid crystal display, including: a lamp for emitting light; a light guide plate disposed at a side of the lamp to guide the light; and a prism sheet disposed above the light guide plate to diffuse or condense the light incident from the light guide plate, wherein the prism sheet includes a substrate on which the light is incident, and a convex part protruded from one surface of the substrate by a predetermined thickness.

According to the present invention, the light condensation and diffusion efficiency are remarkably increased, thereby improving the luminance and viewing angle characteristics. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
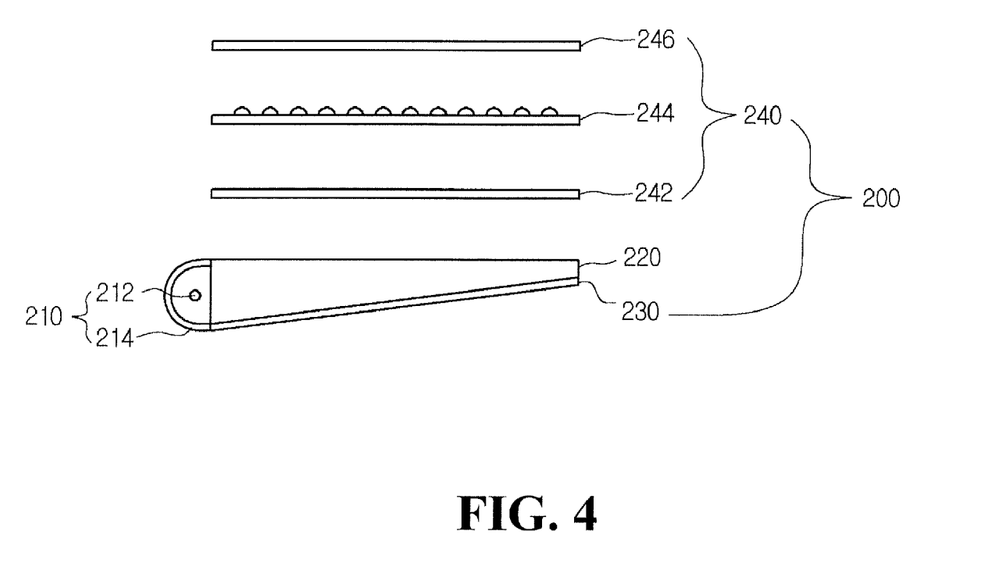
FIG. 4 is a sectional view of a backlight assembly in an LCD according to a first embodiment of the present invention.

FIG. 4 is a sectional view of a backlight assembly in an LCD according to a first embodiment of the present invention.

Referring to FIG. 4, the backlight assembly 200 includes a lamp unit 210 for emitting the light, and a light guide unit for guiding the light emitted from the lamp unit 210 toward a liquid crystal panel.

The lamp unit 210 includes a lamp 212 for emitting the light, and a lamp reflector 214 surrounding the lamp 212. The light emitted from the lamp 212 is incident on a light guide plate 220.

The lamp reflector 214 reflects the emitted light toward the light guide plate 220 to thereby increase an amount of light incident on the light guide plate 220.

The light guide unit includes the reflection plate 230, the light guide plate 220, and a plurality of optical sheets 240. The light guide plate 220 is disposed on one side of the lamp unit 210 and guides the light emitted from the lamp unit 210 toward the liquid crystal panel.

The reflection plate 230 is disposed under the light guide plate 220. Light leaking out from the light guide plate 220 is again reflected toward the light guide plate 220 by the reflection plate 230.

The optical sheets 240 are disposed above the light guide plate 220 to enhance the efficiency of the light guided by the light guide plate 220. In further detail, the optical sheets 240 include a diffusion sheet 242, a prism sheet 244, and a protection sheet 246, which are sequentially stacked on the light guide plate 220.

Since the sheets can be interchangeable with the diffusion sheet, the prism sheet, and the protection sheet, although the title of the invention is the optical sheet, the term "prism sheet" is used in some portions for explaining the invention in detail.

The diffusion sheet 242 scatters the light incident from the light guide plate 220 and thus makes a luminance distribution uniform.

The prism sheet 244 is formed of a transparent resin material, such as acryl and polycarbonate. The prism sheet 244 is a receiving medium having a substrate with a plurality of convex parts (which will be described later) on a processed main surface of a sheet. The convex part has a predetermined curvature radius and is ununiform.

The light guided by the light guide plate 220 can have uniform optical characteristics with respect to a wide range due to the convex parts.

Figure 5:
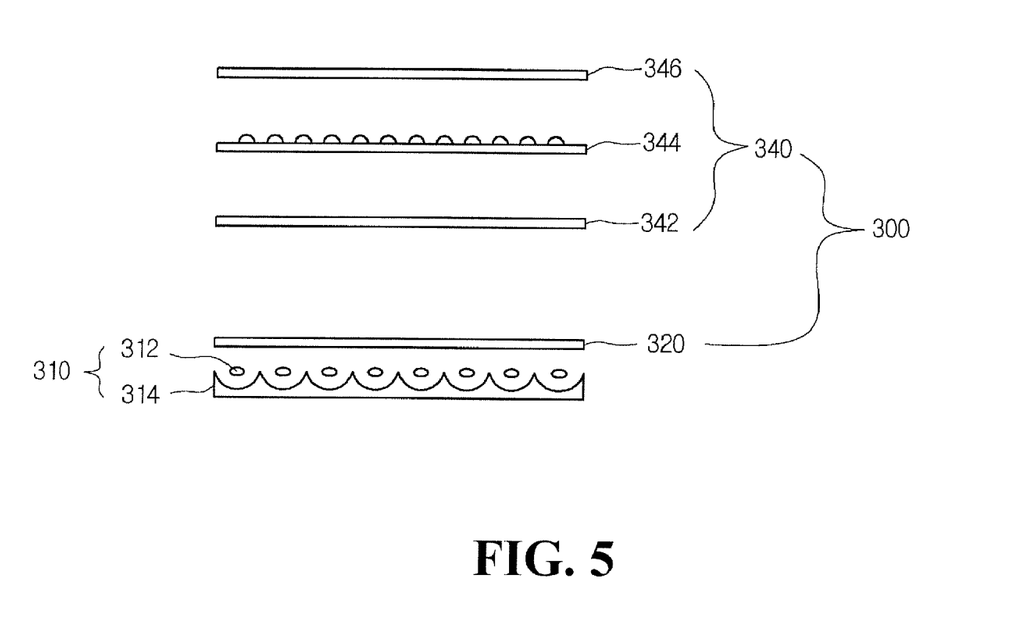
FIG. 5 is a sectional view of a backlight assembly in an LCD according to a second embodiment of the present invention.

FIG. 5 is a sectional view of a backlight assembly in an LCD according to a second embodiment of the present invention.

Referring to FIG. 5, the backlight assembly 300 includes a lamp unit 310 for emitting the light, and a diffusion unit for guiding the light emitted from the lamp unit 310 toward a liquid crystal panel.

The lamp unit 310 includes a lamp 312 for emitting the light, and a lamp reflector 314 surrounding the lamp 312. The light emitted from the lamp 312 is incident on a light guide plate 320. Although the light guide plate 320 is called a diffusion plate, the light guide plate will be used in this invention.

The lamp reflector 314 reflects the emitted light toward the light guide plate 320 to thereby increase an amount of light incident on the light guide plate 320.

The diffusion unit includes the light guide plate 320 and a plurality of optical sheets 340. The light guide plate 320 is disposed above the lamp unit 310 and diffuses the light emitted from the lamp unit 310 such that the light can be guided toward the liquid crystal panel.

Since the light guide plate 320 is disposed above the lamp unit 310, the light leaking out from the light guide plate 320 is again reflected toward the light guide plate 320 by the lamp reflector 314.

The optical sheets 340 are disposed above the light guide plate 320 to enhance the efficiency of the light guided by the light guide plate 320. In further detail, the optical sheets 340 include a diffusion sheet 342, a prism sheet 344, and a protection sheet 346, which are sequentially stacked on the light guide plate 320.

The diffusion sheet 342 scatters the light incident from the light guide plate 320 and thus makes a luminance distribution uniform. Convex parts protruding from one surface of the prism sheet 344 by a predetermined thickness are uniformly formed.

Figure 6:
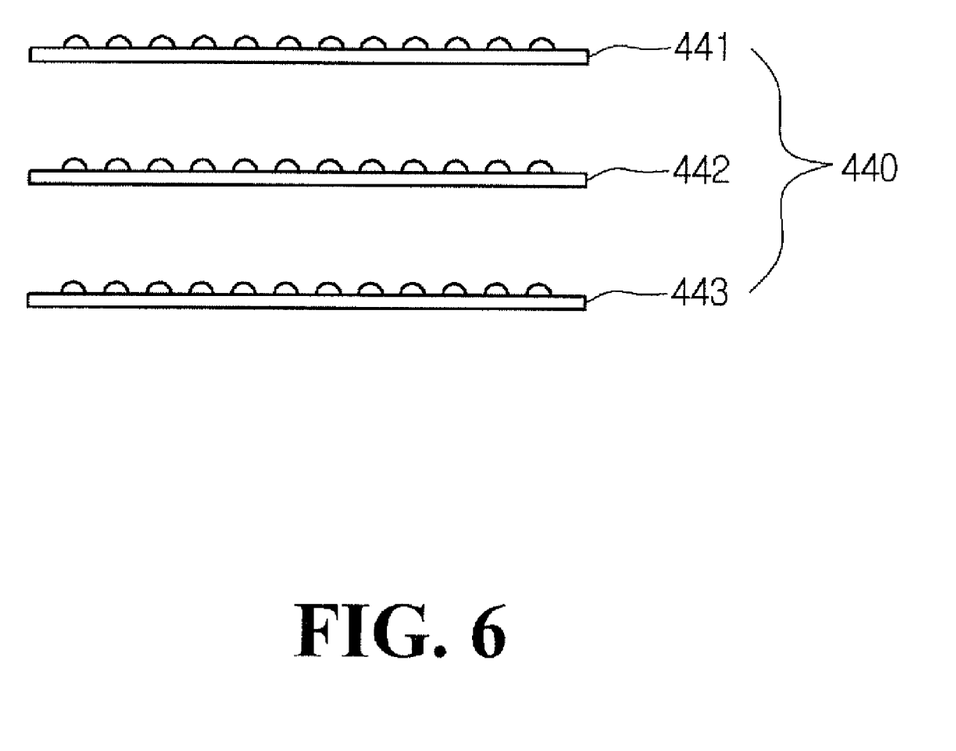
FIG. 6 is a sectional view for explaining the case where two or more optical sheets are stacked according to the embodiment of the present invention.

FIG. 6 is a view for explaining the case where two or more optical sheets are stacked.

Referring to FIG. 6, two or more optical sheets stacked serve as the related art optical sheet.

Specifically, a plurality of optical sheets 441, 442 and 443 with convex parts protruded by a predetermined thickness are stacked. The optical sheets 441, 442 and 443 guide light toward a liquid crystal panel. In this case, the related art diffusion sheet or protection sheet can be replaced with the prism sheets.

Accordingly, compared with the related art optical sheet, the manufacturing cost can be reduced and high luminance can be obtained. Also, it is possible to prevent the occurrence of moire that is an optical phenomenon appearing on a screen in undesirable wavelet pattern.

Figure 7:
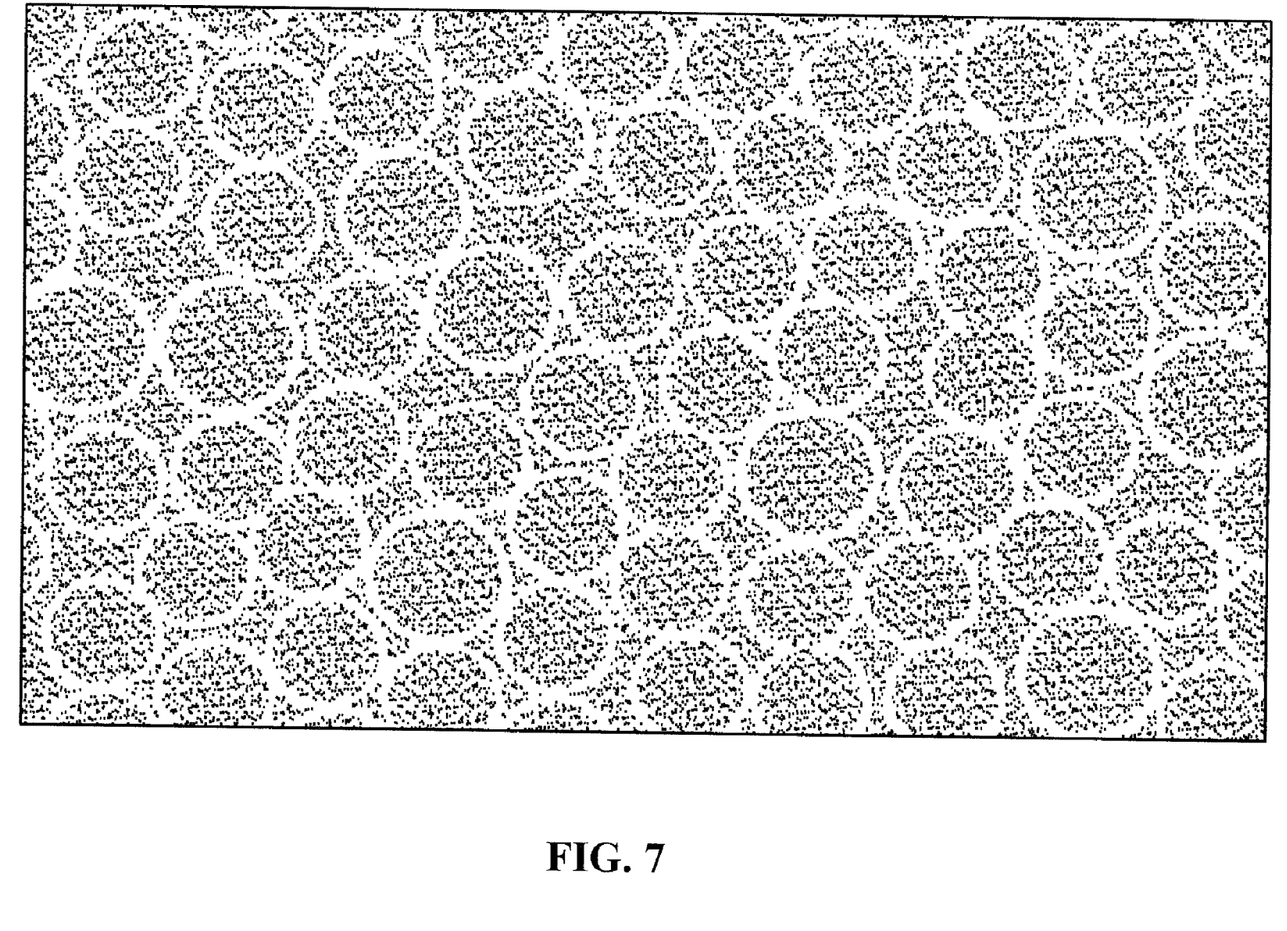
FIG. 7 is a SEM photograph of an array pattern in a convex part according to the embodiment of the present invention.
Figure 8:
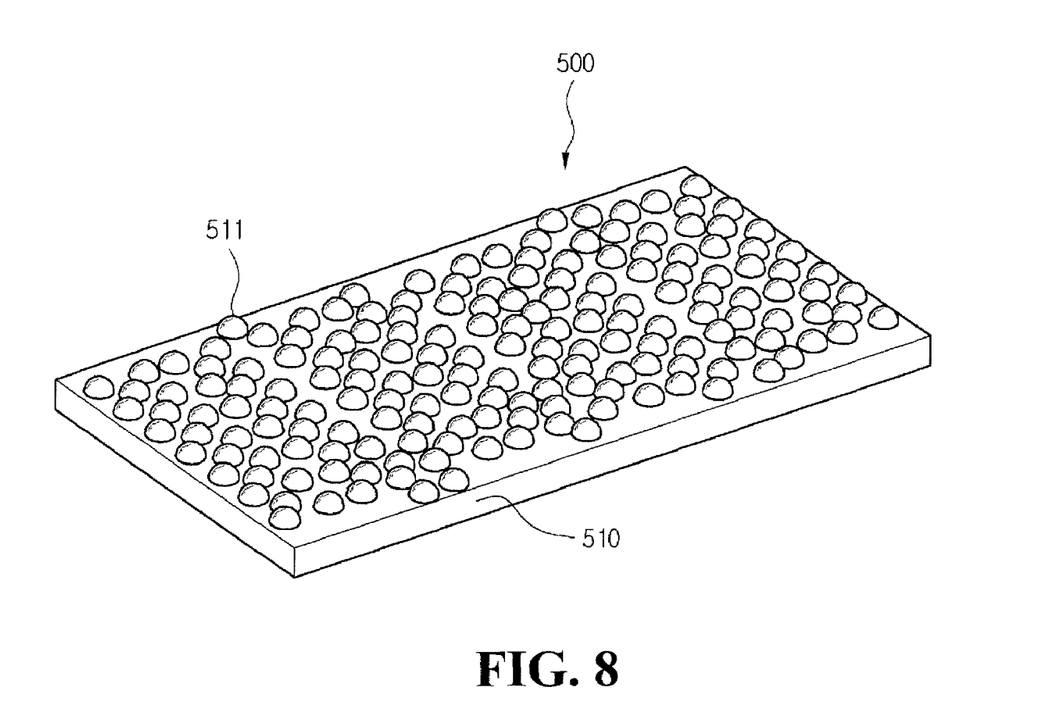
FIG. 8 is a perspective view of the optical sheet according to the embodiment of the present invention.
Figure 9:
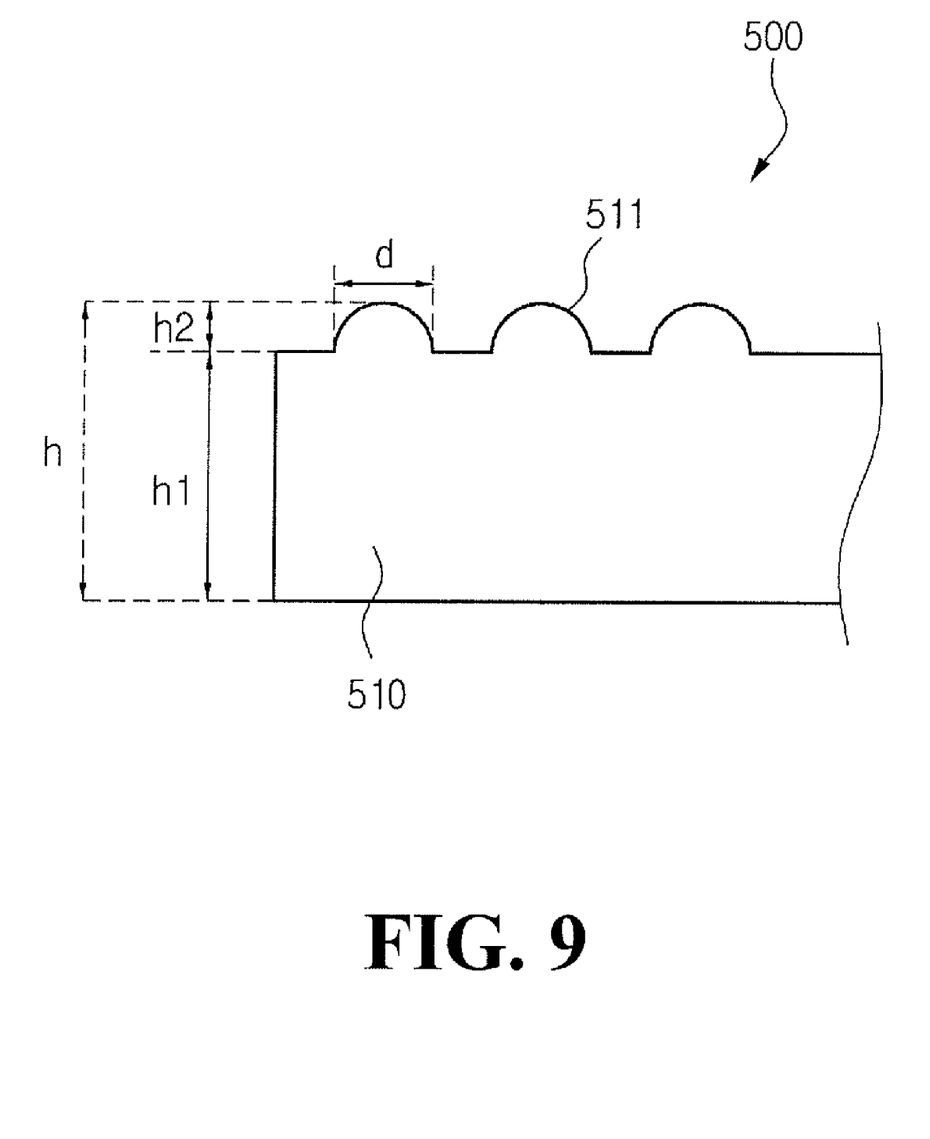
FIG. 9 is a view for explaining the optical sheet according to the embodiment of the present invention.

FIG. 7 is a SEM photograph illustrating an array pattern of the convex parts according to an embodiment of the present invention, FIG. 8 is a perspective view of the optical sheet according to the embodiment of the present invention, and FIG. 9 is a sectional view of the optical sheet according to the embodiment of the present invention.

Referring to FIGS. 7 to 9, the optical sheet according to the embodiment of the present invention includes a substrate 510 onto which light is incident, and a convex part 511 protruding from the substrate 510 by a predetermined thickness.

Specifically, the substrate 510 has a first surface on which the convex parts 511 are formed, and a second surface that is flat and faces the first substrate.

The convex parts 511 are more protruded from its edge toward its center. Therefore, it appears that a plurality of convex lenses are provided on the substrate 510.

As a plurality of convex parts 511 are provided on one surface of the substrate 510, the surface of the substrate 510 can be constructed only with embossing portions. In this case, one surface of the substrate 510 is flat and the other surface thereof is provided with a plurality of embossing portions where a plurality of convex parts 511 are formed.

The convex parts 511 can be provided uniformly and spaced apart from one another by a predetermined distance. Due to the shape of the convex parts 511, light can be diffused in various directions and condensing efficiency can be increased.

When seen from the convex parts 511 (that is, the section of the convex parts formed on the surface of the substrate), the shape of the convex parts 511 is circular or elliptic. Therefore, due to the convex parts 511, the light incident on the substrate 510 can be uniformly diffused or condensed at high efficiency according to its incident angle.

Compared with the triangular prism sheet, the light is diffused in various directions due to the convex parts 511, thus providing a wide viewing angle. Since the convex parts 511 can act as a convex lens, the straightness of light incident at less than a predetermined angle can be improved by the convex parts 511.

Light totally reflected by the convex parts 511 is again reflected by the substrate 510 and again refracted through convex parts 511, and then is condensed or diffused. As described above, the light totally reflected according to the incident angle of the light onto the convex parts 511 is again reflected by the substrate 511 and then diffused or condensed, thereby increasing the use efficiency of the light.

The substrate 510 and the convex parts 511 can be formed in one body. Even when the convex parts 511 are ununiformly arranged, the light can be efficiently diffused and condensed. Meanwhile, a total thickness (h) of the optical sheet 500 may not exceed 300 μm. As the convex parts 511 are protruded from the surface of the substrate 510 by a predetermined thickness, light incident from the lower portion of the optical sheet 500 is refracted in various directions. Therefore, uniform optical characteristics can be obtained in a wide range and a wide viewing angle characteristic can be obtained.

A length (d) of the convex part 511 can be provided in a different size in a range of 45-70 μm.

A thickness (h2) of the convex part 511 protruded from the substrate 510 is ⅓-⅔ times of the average diameter (d) of the convex part 511. Moire occurring when the optical sheets 500 with the convex parts are stacked can be remarkably reduced and the luminance can be increased.

When the number of the convex parts 511 formed on the substrate 510 is 20-44 per 300 μm×300 μm, the use efficiency of the light incident from the lower portion of the optical sheet can be more increased.

The number of the convex parts 511 can be given as Eq. (1) below

Number of convex parts $(n) = 150^2/r^2 > 18$     (1)

where n: number of convex parts per 300 μm×300 μm
r=d/2 (d: average length of convex parts)
45 μm<d<70 μm Using Eq. (1), when the average length of the convex parts is 45 μm, maximum 44 convex parts per 300 μm×300 μm can be arranged.

The convex parts can be formed on the substrate 510 while maintaining a 2:1 ratio between the convex parts with d=50 μm and the convex parts with d=45 μm.

For example, the convex parts with d=50 μm, the convex parts with d=45 μm, the convex parts with d=55 μm, the convex parts with d=60 μm, and the convex parts with d=65 μm can be provided at 50%, 25%, 10%, 10%, and 5%, respectively. In this case, the use efficiency of the light can be more increased.

Moire phenomenon under various situations can be prevented by properly adjusting the number of the convex parts per unit area.

FIG. 7 is a SEM photograph illustrating the array pattern of the convex parts according to the embodiment of the present invention. As illustrated in FIG. 7, the convex parts 511 can be formed ununiformly and thus the wide viewing angel can be obtained.

Meanwhile, Table 1 below shows the luminance gain in the case where 27 convex parts 511 per 300 μm×300 82 m are formed and the case where 34 convex parts 511 per 300 μm×300 μm are formed.

TABLE 1

|  | LUMINANCE GAIN |
| --- | --- |
| SHEET 1 | 1.28 |
| SHEET 2 | 1.30 |

In Table 1, the sheet 1 is an optical sheet where 27 convex parts 511 per 300 μm×300 μm are formed, and the sheet 2 is an optical sheet where 34 convex parts 511 per 300 μm×300 μm are formed. The luminance gain is calculated by Ls/Lo, where Ls represents the luminance of the backlight unit having the sheet and Lo represents the luminance of the backlight unit having no sheet.

Meanwhile, Table 2 below shows variation of the optical characteristic when the optical sheets with the convex parts according to the embodiment of the present invention are stacked. Data in the Table 2 are based on the optical sheet where 34 convex parts per 300 μm×300 μm are formed.

TABLE 2

|  | LUMINANCE GAIN |
| --- | --- |
| EMBODIMENT 1 | 1.28 |
| EMBODIMENT 2 | 1.30 |
| EMBODIMENT 3 | 1.35 |

In Table 2, the embodiment 1 represents the case where 1 optical sheet is used, the embodiment 2 represents the case where 2 optical sheets are stacked, and the embodiment 3 represents the case where 3 optical sheets are stacked.

As can be seen from Table 2, as the number of the optical sheets with the convex parts increases from 1 to 3, the luminance gain also increases from 1.28 to 1.35.

In the combination of the diffusion sheet, the optical sheet and the protection sheet as a backlight unit, 2-3 optical sheets according to the present invention can be stacked.

Also, the thickness (h2) of the protruded convex part 511 can be changed in a range of ⅓-⅔ times of the average length (d) of the convex parts. In this manner, the luminance gain of the optical sheet 500 can be improved.

Meanwhile, Table 3 below shows the luminance gain according to the thickness (h2) of the protruded convex parts 511 according to the present invention.

TABLE 3

|  | LUMINANCE GAIN |
| --- | --- |
| EMBODIMENT 4 | 1.20 |
| EMBODIMENT 5 | 1.28 |
| EMBODIMENT 6 | 1.15 |

In Table 3, the embodiment 4 represents the sheet in which the thickness (h2) of the protruded convex part is ⅓ times of the average length (d) of the convex parts, the embodiment 5 represents the sheet in which the thickness (h2) of the protruded convex part is ½ times of the average length (d) of the convex parts, and the embodiment 6 represents the sheet in which the thickness (h2) of the protruded convex part is ⅔ times of the average length (d) of the convex parts.

As can be seen from Table 3, the embodiment 5 (that is, the case where the thickness (h2) of the protruded convex part is ½ times of the average length (d) of the convex parts) has higher luminance gain than any other embodiment.

Accordingly, the thickness (h2) of the protruded convex part 511 can be formed on the optical sheet 500 to ½ times of the average length (d) of the convex parts 511.

Figure 10:
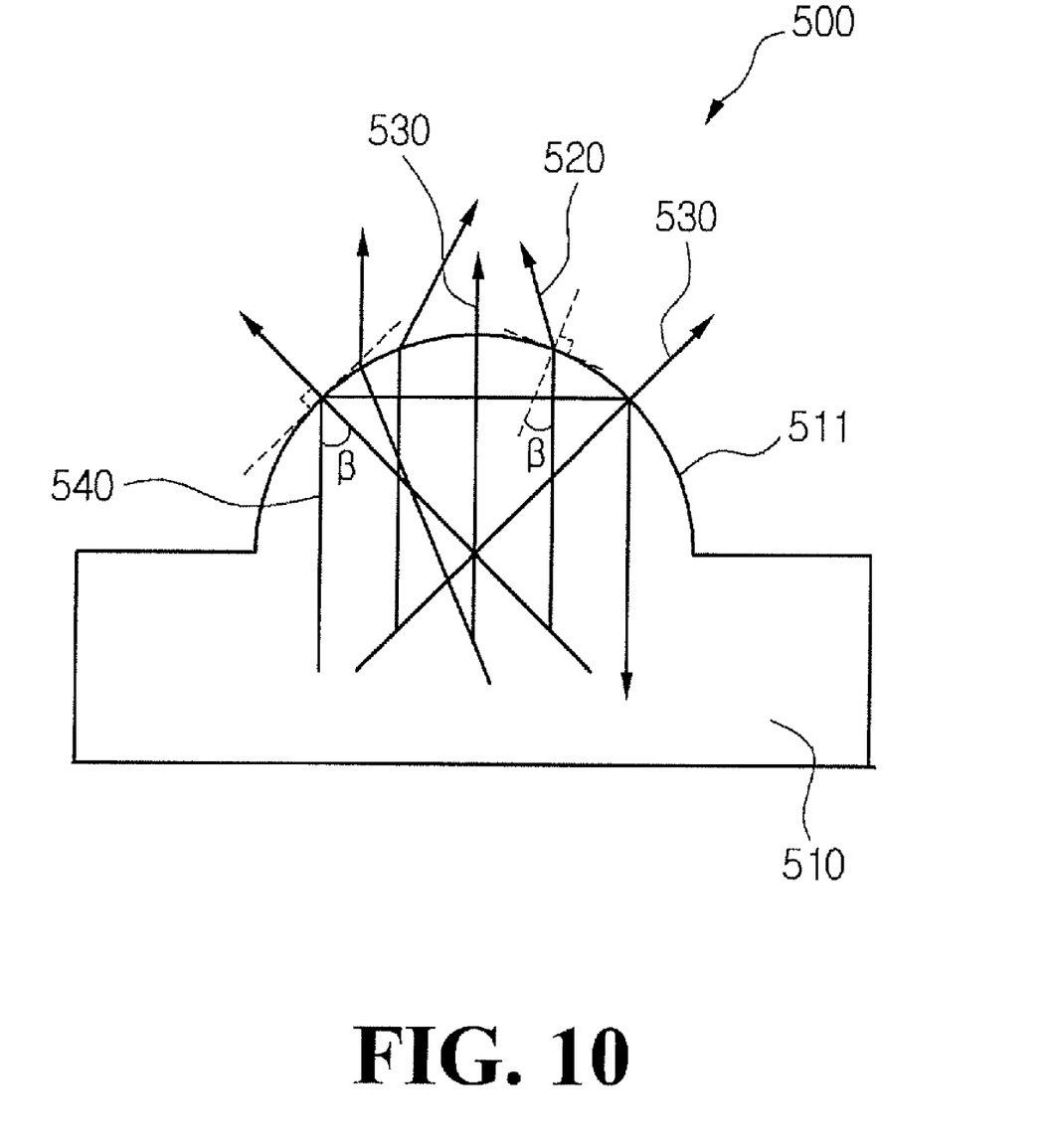
FIG. 10 is a view for explaining a refraction of light incident onto the optical sheet according to the embodiment of the present invention.

FIG. 10 is a view for explaining a refraction of light incident onto the optical sheet according to the embodiment of the present invention.

Referring to FIG. 10, the light passing through the light guide plates 220 (320) is incident onto the substrate 510 in the optical sheet 500 according to the embodiment of the present invention. The light incident onto the substrate 510 is refracted, diffused or totally reflected by the convex parts 511.

Regarding the light refraction, a total internal reflection (TIR) occurs when the incident angle of light onto the interface of the media with different refractive index is more than a critical angle. When the incident angle is less than the critical angle, the light is refracted according to the refractive index of the media and then transmitted.

The light passing through the optical sheet 500 is refracted according to its incident angle and then condensed or diffused, and then is totally reflected.

Specifically, when the light 540 whose incident angle (β) is about 45° is incident onto the convex parts 511, the light 540 is totally reflected. When the light 520 whose incident angle (β) is less than 45° is incident onto the convex parts 511, the light 520 is refracted and condensed, thereby increasing the transmittance and the luminance.

Due to the diffused light among the light whose incident angle (β) is less than 45°, the viewing angle characteristic can be improved.

When the light 530 whose incident angle (β) is 0° is incident onto the convex parts 511, the light 530 maintains the straightness without refraction. In this case, the light 530 with the incident angle (β) of 0° can improve the viewing angle of the LCD.

According to the present invention, the optical characteristics of the luminance and the viewing angle can be differently set by adjusting the thickness, number, and size of the protruded convex parts formed on the optical sheet.

It will be apparent to those skilled in the art that various modifications and variations can be made in the present invention. Thus, it is intended that the present invention covers the modifications and variations of this invention provided they come within the scope of the appended claims and their equivalent.

What is claimed is:

1. An optical sheet comprising:
   a substrate; and
   a plurality of convex parts protruded from the substrate by a predetermined thickness, a thickness of each of the plurality of convex parts increasing from an edge to a center thereof, wherein each of the plurality of convex parts is formed in a circular shape, wherein at least two convex parts are formed in different sizes on the substrate, and an average length of the convex parts is provided in a range of 45~70 μm, and the plurality of convex parts are ununiformly arranged in plurality on the substrate.

2. The optical sheet according to claim 1, wherein the plurality of convex parts and the substrate are formed in one body.

3. The optical sheet according to claim 1, wherein the plurality of convex parts refract the light incident onto the substrate in all directions.

4. The optical sheet according to claim 1, wherein the plurality of convex parts are protruded in a projecting direction of the light incident onto the substrate.

5. An optical sheet comprising:
   a substrate; and
   a plurality of convex parts protruded from the substrate, wherein each of the plurality of convex parts is formed in a substantially hemispherical, and at least two convex parts are formed in different sizes on the substrate, and an average length of the convex parts is in a range of 45~70 μm, and the plurality of convex parts are ununiformly arranged in plurality on the substrate.

6. A backlight assembly of a liquid crystal display, comprising:
   a lamp for emitting light; and
   an optical sheet comprising a substrate, and a plurality of convex parts protruded from the substrate,
   wherein each of the plurality of convex parts is a circular shape, and at least two convex parts are formed in different sizes on the substrate, and an average length of the convex parts is provided in a range of 45~70 μm, and the plurality of convex parts are ununiformly arranged in plurality on the substrate.

7. A backlight assembly of a liquid crystal display, comprising:
   a lamp for emitting light; and
   an optical sheet comprising a substrate, and a plurality of convex parts protruded from the substrate,
   wherein at least one convex part is formed in a hemisphere shape, and at least two convex parts are formed in different sizes on the substrate, and an average length of the convex parts is in a range 45~70 μm, and the plurality of convex parts are ununiformly arranged in plurality on the substrate.

* * * * *